(12) United States Patent
Liu et al.

(10) Patent No.: US 11,176,074 B2
(45) Date of Patent: Nov. 16, 2021

(54) CHIP AND INTERFACE CONVERSION DEVICE

(71) Applicant: VIA LABS, INC., New Taipei (TW)

(72) Inventors: Yun-Tien Liu, New Taipei (TW);
Cheng-Chung Lin, New Taipei (TW);
Hsiao-Chyi Lin, New Taipei (TW);
Shao-Yu Chen, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 17/023,397

(22) Filed: Sep. 17, 2020

(65) Prior Publication Data

US 2021/0117355 A1  Apr. 22, 2021

Related U.S. Application Data

(60) Provisional application No. 62/924,686, filed on Oct. 22, 2019.

(30) Foreign Application Priority Data

Aug. 21, 2020 (TW) .................................. 109128534

(51) Int. Cl.
*G06F 13/40* (2006.01)
*G06F 13/38* (2006.01)
*G06F 15/78* (2006.01)

(52) U.S. Cl.
CPC ........ *G06F 13/4022* (2013.01); *G06F 13/385* (2013.01); *G06F 15/7842* (2013.01); *G06F 2213/0042* (2013.01)

(58) Field of Classification Search
CPC ............... G06F 13/4022; G06F 13/385; G06F 15/7842; G06F 2213/0042
See application file for complete search history.

(56) References Cited

U.S. PATENT DOCUMENTS 8,112,571 B1 * 2/2012 Letourneur ......... G06F 13/4295
710/311
9,128,691 B2 9/2015 Liu
(Continued)

FOREIGN PATENT DOCUMENTS

CN  204480239  7/2015
CN  207473602  6/2018
(Continued)

OTHER PUBLICATIONS

"Office Action of Taiwan Counterpart Application", dated Jun. 3, 2021, p. 1-p. 5.

*Primary Examiner* — Henry Tsai
*Assistant Examiner* — Aurangzeb Hassan
(74) *Attorney, Agent, or Firm* — JCIPRNET

(57) ABSTRACT

A chip and an interface conversion device are provided. The chip includes first, second, third, fourth, fifth and sixth pads. The first and second pads are coupled to first and second SBU pins of a USB connector respectively. The fourth and the sixth pads are coupled to first and second pins of an AUX channel of a DP connector respectively. When the chip operates in a first mode, first and second AUX channel signals generated by the chip are transmitted to the third and fifth pads respectively, a voltage of the fourth pad is weakly pulled down, and a voltage of the sixth pad is weakly pulled up. When the chip operates in a second mode, one of the first and second pads is connected to the fourth pad, and the other one of the first and second pads is connected to the sixth pad.

19 Claims, 6 Drawing Sheets

(56) References Cited

U.S. PATENT DOCUMENTS

| | | | |
|---|---|---|---|
| 10,353,853 B1* | 7/2019 | Khamesra | G06F 13/385 |
| 2005/0198407 A1* | 9/2005 | Lee | G06F 1/266 |
| | | | 710/15 |
| 2014/0329416 A1* | 11/2014 | Golko | H01R 29/00 |
| | | | 439/676 |
| 2014/0365695 A1 | 12/2014 | Peng et al. | |
| 2016/0371099 A1* | 12/2016 | Woog | H04L 67/24 |
| 2018/0027330 A1 | 1/2018 | Rand et al. | |
| 2019/0317774 A1* | 10/2019 | Raghav | G06F 9/4406 |
| 2021/0064558 A1* | 3/2021 | Tseng | G06F 13/4282 |

FOREIGN PATENT DOCUMENTS

| | | |
|---|---|---|
| CN | 104820651 | 12/2018 |
| JP | 6265706 | 1/2018 |
| TW | I538326 | 6/2016 |
| WO | 2017046789 | 3/2017 |

* cited by examiner

CHIP AND INTERFACE CONVERSION DEVICE

CROSS-REFERENCE TO RELATED APPLICATION

This application claims the priority benefits of U.S. provisional application No. 62/924,686, filed on Oct. 22, 2019 and Taiwan application no. 109128534, filed on Aug. 21, 2020. The entirety of each of the above-mentioned patent applications is hereby incorporated by reference herein and made a part of this specification.

TECHNICAL FIELD

The invention relates to an electronic device, and more particularly, to a chip and an interface conversion device.

BACKGROUND

In the existing communication technology, a host and a device use the same transmission interface to transmit data to each other. When the transmission interface used by the host is different from the transmission interface used by the device, an interface conversion device needs to be disposed between the host and the device. For instance, it assumed that the transmission interface of the host is Universal Serial Bus (hereinafter referred to as USB), and the transmission interface used by the device is DisplayPort (hereinafter referred to as DP). The interface conversion device can provide an interface conversion function to transmit data from a USB Type-C connector of the host to a DP connector of the device, and (or) transmit data from the DP connector of the device to the USB Type-C connector of the host.

A USB Type-C connector of the interface conversion device is connected to the USB Type-C connector of the host. When the USB Type-C connector of the host transmits signals compliant with a USB 3.1 specification, the host can operate in a DisplayPort alternative mode (hereinafter referred to as ALT mode) of USB Type-C, so as to output data and auxiliary channel (hereinafter referred to as AUX channel) signals compliant with a DP specification from the USB Type-C connector. When the USB Type-C connector of the host operates in the ALT mode, a side band use (hereinafter referred to as SBU) pin of the USB Type-C connector of the host is used to transmit the AUX channel signals compliant with the DP specification. When the USB Type-C connector of the host transmits signals compliant with a USB 4.0 specification, the SBU pin of the USB Type-C connector of the host is used to transmit side band signals compliant with a USB specification.

Regardless of whether the USB Type-C connector of the host operates in the ALT mode of USB or operates in USB 4.0, the interface conversion device needs to be capable of processing the signals from the USB Type-C connector of the host. A DP connector of the interface conversion device is connected to the DP connector of the device. Regardless of whether the signals transmitted by the SBU pin of the USB Type-C connector of the host to the interface conversion device are the AUX channel signals compliant with the DP specification or the side band signals compliant with the USB specification, an AUX channel pin of the DP connector of the interface conversion device needs to be compliant with the DP specification.

It should be noted that, the content in the paragraph "Description of Related Art" are intended to assist understanding the invention. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the invention.

SUMMARY

The invention provides a chip and an interface conversion device which allow the auxiliary channel (hereinafter referred to as AUX channel) pins of the display port (hereinafter referred to as DP) connector to be compliant with the DP specification in different modes.

The chip of the invention includes a first pad, a second pad, a third pad, a fourth pad, a fifth pad and a sixth pad. The first pad is configured to be coupled to a first side band use (hereinafter referred to as SBU) pin of a universal serial bus (hereinafter referred to as USB) connector. The second pad is configured to be coupled to a second SBU pin of the USB connector. The third pad is configured to be coupled to a first terminal of a first capacitor. The fourth pad is configured to be coupled to a second terminal of the first capacitor, and configured to be coupled to a first pin of an AUX channel of a DP connector. The fifth pad is configured to be coupled to a first terminal of a second capacitor. The sixth pad is configured to be coupled to a second terminal of the second capacitor, and configured to be coupled to a second pin of the AUX channel of the DP connector. When the chip operates in a first mode, a first AUX channel signal and a second AUX channel signal compliant with a display port specification are selectively transmitted to the third pad and the fifth pad respectively, and a voltage of the fourth pad is selectively weakly pulled down, and a voltage of the sixth pad is selectively weakly pulled up. When the chip operates in a second mode, one of the first pad and the second pad is connected to the fourth pad, and the other one of the first pad and the second pad is connected to the sixth pad.

An interface conversion device of the invention includes a USB connector, a DP connector, a first capacitor, a second capacitor and a chip. The chip includes a first pad, a second pad, a third pad, a fourth pad, a fifth pad and a sixth pad. The first pad is coupled to a first SBU pin of the USB connector. The second pad is coupled to a second SBU pin of the USB connector. The third pad is coupled to a first terminal of the first capacitor. The fourth pad is coupled to a second terminal of the first capacitor and a first pin of an AUX channel of the DP connector. The fifth pad is coupled to a first terminal of the second capacitor. The sixth pad is coupled to a second terminal of the second capacitor and a second pin of the AUX channel of the DP connector. When the chip operates in a first mode, the chip selectively transmits a first AUX channel signal and a second AUX channel signal compliant with a display port specification to the third pad and the fifth pad respectively, the chip selectively weakly pulls down a voltage of the fourth pad, and the chip selectively weakly pulls up a voltage of the sixth pad. When the chip operates in a second mode, the chip selectively connects one of the first pad and the second pad to the fourth pad, and the chip selectively connects the other one of the first pad and the second pad to the sixth pad.

Based on the above, the interface conversion device can process the signals of the USB connector, regardless of whether the signals transmitted by an external device (e.g., the host) to the USB connector are signals in the first mode or the signals in the second mode. The chip can allow the AUX channel pins of the DP connector to be compliant with the DP specification in different modes.

To make the aforementioned more comprehensible, several embodiments accompanied with drawings are described in detail as follows.

DETAILED DESCRIPTION

Figure 1A:
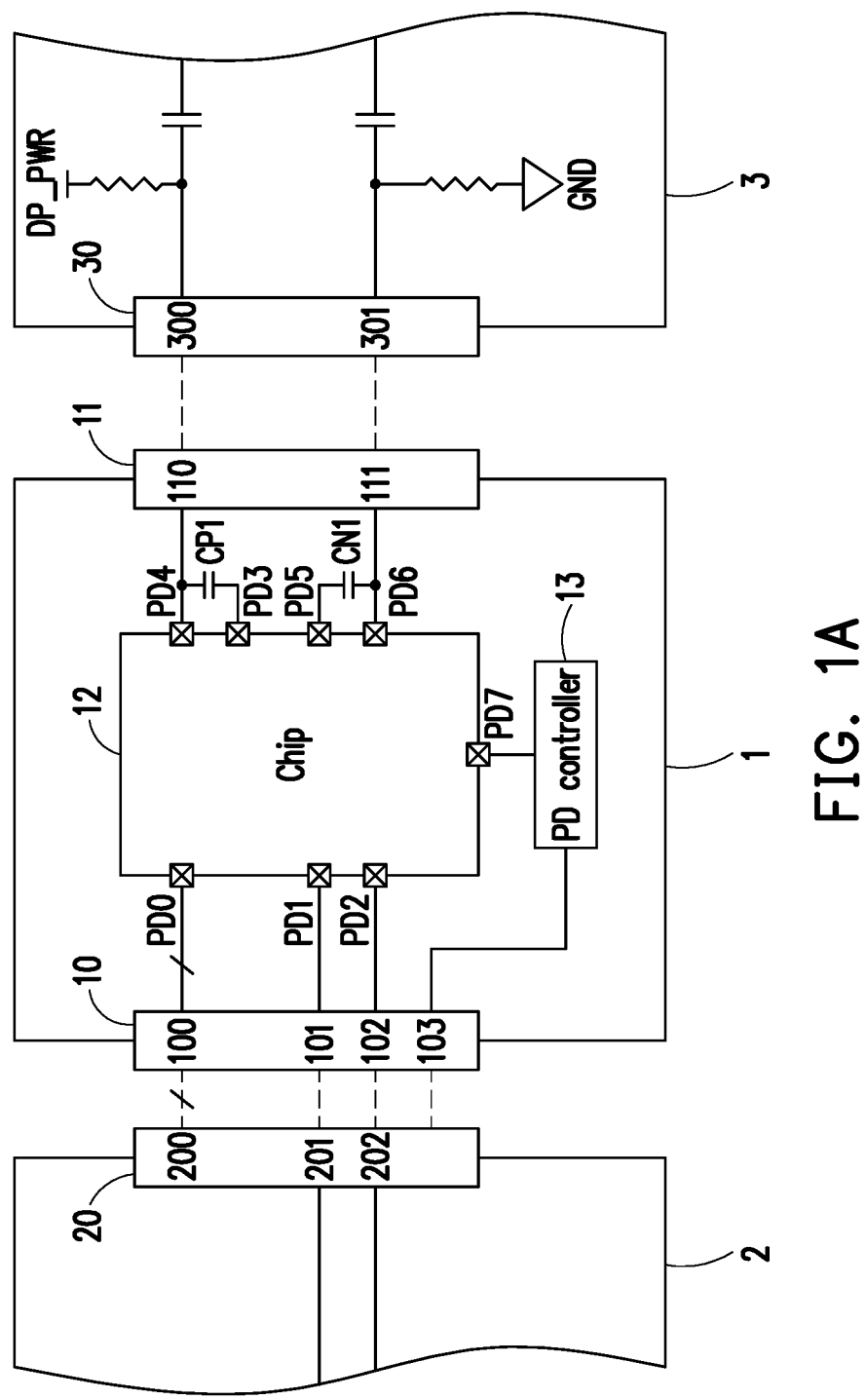
FIG. 1A and FIG. 1B are circuit block diagrams illustrating an interface conversion device connected between a host and a device according to embodiments of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms such as "first", "second" and the like as recited in full text of the specification (including claims) are intended to give the elements names or distinguish different embodiments or scopes, and are not intended to limit an upper limit or a lower limit of the number of the elements nor limit an order of the elements. Moreover, wherever possible, elements/components/steps with same reference numerals represent same or similar parts in the drawings and embodiments. Elements/components/steps with the same reference numerals or names in different embodiments may be cross-referenced.

Figure 1B:
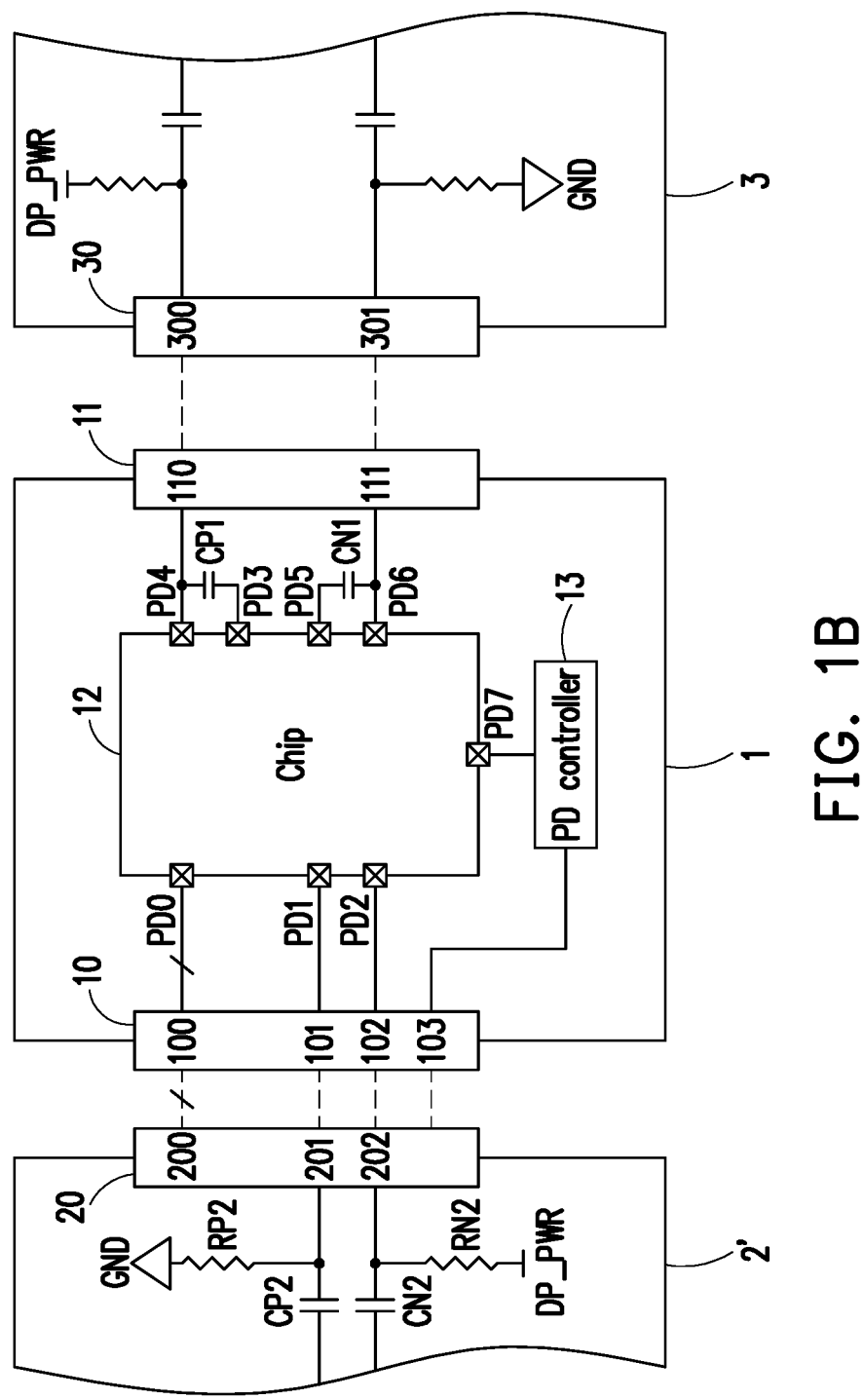

FIG. 1A and FIG. 1B are circuit block diagrams illustrating an interface conversion device 1 connected between a host 2 (or a host 2') and a device 3 according to embodiments of the invention. The interface conversion device 1 has a universal serial bus (hereinafter referred to as USB) connector 10 and a display port (DisplayPort; hereinafter referred to as DP) connector 11.

The USB connector 10 may be connected to a USB connector 20 of the host 2 (or the host 2') through a cable (or they may be directly connected together). At least one differential signal pin 100 of the USB connector 10 (or at least one differential signal pin 200 of the USB connector 20) may include a SSTXp1 pin, a SSTXn1 pin, a SSRXp1 pin, a SSRXn1 pin, a SSTXp2 pin, a SSTXn2 pin, SSRXp2 pin, a SSRXn2 pin, a Dp1 pin, a Dn1 pin, a Dp2 pin and (or) a Dn2 pin specified by the USB specification. Side band use (hereinafter referred to as SBU) pins 101 and 102 of the USB connector 10 (or SBU pins 201 and 202 of the USB connector 20) may include a SBU1 pin a SBU2 pin specified by a USB specification. A configuration channel (hereinafter referred to as CC) pin 103 of the USB connector 10 of the interface conversion device 1 may include a CC1 pin and (or) a CC2 pin specified by the USB specification.

FIG. 1A shows that the host 2 is an electronic device supporting a USB 4.0 specification. Signals transmitted by the USB connector 20 of the host 2 are compliant with the USB 4.0 specification. That is to say, a circuit configuration of the host 2 is compliant with the USB 4.0 specification. When the USB connector 20 of the host 2 transmits the signals compliant with the USB 4.0 specification, SBU pins 201 and 202 of the USB connector 20 of the host 2 are used to transmit side band signals compliant with the USB specification. The SBU pins and the sideband signals are specified in the USB 4.0 specification, and thus detail regarding the same is not repeated herein. When the signals transmitted by the host 2 are USB 4.0 signals compliant with the USB 4.0 specification, the host 2 can use a tunneling protocol to encode the data and AUX channel signals of a DP specification in packets of the USB 4.0 signals. Therefore, the AUX channel signals can be transmitted to the differential signal pin 100 of the interface conversion device 1 through the pin 200 of the USB connector 20. In this case, the interface conversion device 1 can correspondingly operate in the first mode.

In the first mode, the interface conversion device 1 can unpack and (or) decode the differential signals received by the differential signal pin 100 to generate the data and the AUX channel signals compliant with the DP specification. Accordingly, the interface conversion device 1 can output the AUX channel signals from a first pin 110 and a second pin 111 of an AUX channel of the DP connector 11 to the device 3.

FIG. 1B shows that the host 2' is an electronic device supporting the DisplayPort alternative mode (hereinafter referred to as ALT mode) of USB Type-C. The host 2' further includes a capacitor CP2, a capacitor CN2, a pull-down resistor RP2, and a pull-up resistor RN2. A first terminal of the pull-down resistor RP2 receives a first reference voltage (e.g., a ground voltage GND). A second terminal of the pull-down resistor RP2 and a first terminal of the capacitor CP2 are coupled to the SBU pin 201 of the USB connector 20. A first terminal of the pull-up resistor RN2 receives a second reference voltage (e.g., a system voltage DP_PWR higher than the ground voltage GND). A second terminal of the pull-up resistor RN2 and a first terminal of the capacitor CN2 are coupled to the SBU pin 202 of the USB connector 20. The host 2' can operate in the ALT mode to output the data and the auxiliary channel (hereinafter referred to as AUX channel) signals compliant with the DP specification from the USB connector 20. The AUX channel signals are specified in the DP specification, and thus detail regarding the same is not repeated herein. When the USB connector 20 of the host 2' operates in the ALT mode, the SBU pins 201 and 202 of the USB connector 20 of the host 2' can be used to transmit the AUX channel signals compliant with the DP specification.

Referring to FIG. 1A or FIG. 1B, the DP connector 11 may be connected to a DP connector 30 of the device 3 through a cable (or they may be directly connected together). The AUX channel pins 110 and 111 of the DP connector 11 of the interface conversion device 1 (or AUX channel pins 300 and 301 of the DP connector 30 of the device 3) may include an AUX_CH(p) pin and an AUX_CH (n) pin specified by the DP specification. The interface conversion device 1 can provide an interface conversion function to transmit data from the USB connector 20 (e.g., a USB Type-C connector) of the host 2 (or the host 2') to the DP connector 30 of the device 3, and (or) transmit data from the DP connector 30 of the device 3 to the USB connector 20 of the host 2 (or the host 2').

The interface conversion device 1 further includes a chip 12, a power delivery (hereinafter referred to as PD) controller 13, a first capacitor CP1 and a second capacitor CN1. According to a connection configuration signal provided by the PD controller 13, the chip 12 of the interface conversion device 1 can selectively operate in the first mode, the second mode and (or) other modes. For instance, when the host 2 is connected to the USB connector 10 (as shown in FIG. 1A), the chip 12 can selectively operate in the first mode (USB 4.0 mode). When the host 2' is connected to the USB connector 10 (as shown in FIG. 1B), the chip 12 can selectively operate in the second mode (ALT mode).

The chip 12 further includes a pad PD0, a pad PD1, a pad PD2, a pad PD3, a pad PD4, a pad PD5 and a pad PD6. The differential signal pin 100 of the USB connector 10 is coupled to at least one pad PD0 of the chip 12. The pad PD1 and the pad PD2 of the chip 12 are configured to be coupled to the SBU pin 101 and the SBU pin 102 of the USB connector 10.

The CC pin 103 of the USB connector 10 is coupled to the PD controller 13. When the host 2 (or the host 2') is connected to the USB connector 10, the PD controller 13 can exchange configuration information with the host 2 (or the host 2') through the CC pin 103, and detect a connection configuration of the USB connector 10 through the CC pin 103. Related operations of PD (power transmission) control and the CC pin are specified in the USB specification, and thus not repeated herein. Therefore, according to a detection result of the CC pin 103, the PD controller 13 can know whether the host connected to the USB connector 10 is an electronic device compliant with the USB 4.0 specification (e.g., the host 2) or an electronic device operating in the ALT mode (e.g., the host 2'). In addition, according to the detection result of the CC pin 103, the PD controller 13 can know whether a USB Type-C plug (not shown) of the host 2 (or the host 2') is inserted into the USB connector 10 with a front side facing up or inserted into the USB connector 10 with a back side facing up. The PD controller 13 can provide the connection configuration signal to the pad PD7 of the chip 12 according to the connection configuration of the USB connector 10 to indicate that the chip 12 operates in the first mode or the second mode.

The pad PD3 is configured to be coupled to a first terminal of the capacitor CP1. The pad PD4 is configured to be coupled to a second terminal of the capacitor CP1. The pad PD5 is configured to be coupled to a first terminal of the capacitor CN1. The pad PD6 is configured to be coupled to a second terminal of the capacitor CN1. The first pin 110 and the second pin 111 of the AUX channel of the DP connector 11 are connected to the pad PD4 and the pad PD6 of the chip 12 respectively. The DP connector 30 of the device 3 includes the AUX channel pins 300 and 301. When the DP connector 11 is connected to the DP connector 30, the device 3 can transmit/receive signals to/from the first pin 110 and the second pin 111 of the AUX channel of the DP connector 11 through the pins 300 and 301.

The pad PD7 of the chip 12 of the interface conversion device 1 is coupled to the PD controller 13 to receive the connection configuration signal. The chip 12 can determine whether the interface conversion device 1 operates in the first mode, the second mode, and (or) other modes according to the connection configuration signal.

In one embodiment, referring to FIG. 1A, when the chip 12 in the interface conversion device 1 operates in the first mode (i.e., the signals transmitted by the host 2 are the signals compliant with the USB 4.0 specification), the chip 12 can weakly pull down a voltage of the fourth pad PD4 and weakly pull up a voltage of the sixth pad PD6. The so-called "weakly pull down" means that when the fourth pad PD4 is floating, the chip 12 can pull the voltage of the fourth pad PD4 down to a low potential; and when the fourth pad PD4 is coupled to an external element, the external element can change the voltage of the fourth pad PD4. The so-called "weakly pull up" means that when the sixth pad PD6 is floating, the chip 12 can pull the voltage of the sixth pad PD6 up to a high potential; and when the sixth pad PD6 is coupled to an external element, the external element can change the voltage of the sixth pad PD6.

In the first mode, the chip 12 can unpack and (or) decode the differential signals received by the differential signal pin 100 to generate the data and the AUX channel signals compliant with the DP specification. The chip 12 can selectively transmit the AUX channel signals (a first AUX channel signal and a second AUX channel signal) compliant with the DP specification to the pad PD3 and the pad PD5 respectively. Therefore, the interface conversion device 1 can transmit the AUX channel signals (i.e., the AUX channel signals of the host 2) to the device 3 based on the DP specification.

In another embodiment, referring to FIG. 1B, when the signals transmitted by the host 2 are ALT mode signals compliant with the USB specification, the host 2 can transmit the data compliant with the DP specification through the pin 200, and transmit the data and the AUX channel signals compliant with the DP specification (a third AUX channel signal and a fourth AUX channel signal) through the SBU pins 201 and 202. When the signals transmitted by the host 2 are signals compliant with the ALT mode, the chip 12 in the interface conversion device 1 can correspondingly operate in the second mode.

When the chip 12 in the interface conversion device 1 operates in the second mode, the chip 12 can disable the capacitor CP1 and the capacitor CN1. In the second mode, the chip 12 can selectively connect one of the pad PD1 and the pad PD2 to the pad PD4, and selectively connect the other one of the pad PD1 and the pad PD2 to the pad PD6. Therefore, one of the SBU pin 101 and the SBU pin 102 of the USB connector 10 can be selectively connected to the first pin 110 of the AUX channel of the DP connector 11, and the other one of the SBU pin 101 and the SBU pin 102 can be selectively connected to the second pin 111 of the AUX channel of the DP connector 11. That is, the host 2' can transmit the AUX channel signals to the device 3 through the interface conversion device 1 based on the DP specification.

For instance, it is assumed that the third AUX channel signal received by the SBU pin 101 is a positive AUX channel signal and the fourth AUX channel signal received by the SBU pin 102 is a negative AUX channel signal. Accordingly, the SBU pin 101 of the USB connector 10 can be connected to the first pin 110 of the AUX channel of the DP connector 11 through the chip 12, and the SBU pin 102 of the USB connector 10 can be connected to the second pin 111 of the AUX channel of the DP connector 11 through the chip 12. Alternatively, it is assumed that the third AUX channel signal received by the SBU pin 101 is the negative AUX channel signal and the fourth AUX channel signal received by the SBU pin 102 is the positive AUX channel signal. Accordingly, the SBU pin 101 of the USB connector 10 can be connected to the second pin 111 of the AUX channel of the DP connector 11 through the chip 12, and the SBU pin 102 of the USB connector 10 can be connected to the first pin 110 of the AUX channel of the DP connector 11 through the chip 12. Therefore, the SBU pins 201 and 202 of the USB connector 20 of the host 2' can transmit the AUX channel signals compliant with the DP specification to the AUX channel pins 300 and 301 of the DP connector 30 of the device 3, and (or) the AUX channel pins 300 and 301 of the DP connector 30 of the device 3 can transmit the AUX channel signals compliant with the DP specification to the SBU pins 201 and 202 of the USB connector 20 of the host 2'.

In short, the interface conversion device 1 is suitable for the interface conversion between the host 2 and the device 3 of different specifications. The interface conversion device 1 can process the signals of the USB connector 10, regardless of whether the signals transmitted by an external device (e.g., the host 2 or the host 2') to the USB connector 10 is the signals in the first mode (USB 4.0 mode) or the signals in the second mode (ALT mode). The chip 12 of the interface conversion device 1 can allow the AUX channel pins of the DP connector 11 to be compliant with the DP specification in different modes.

Figure 2:
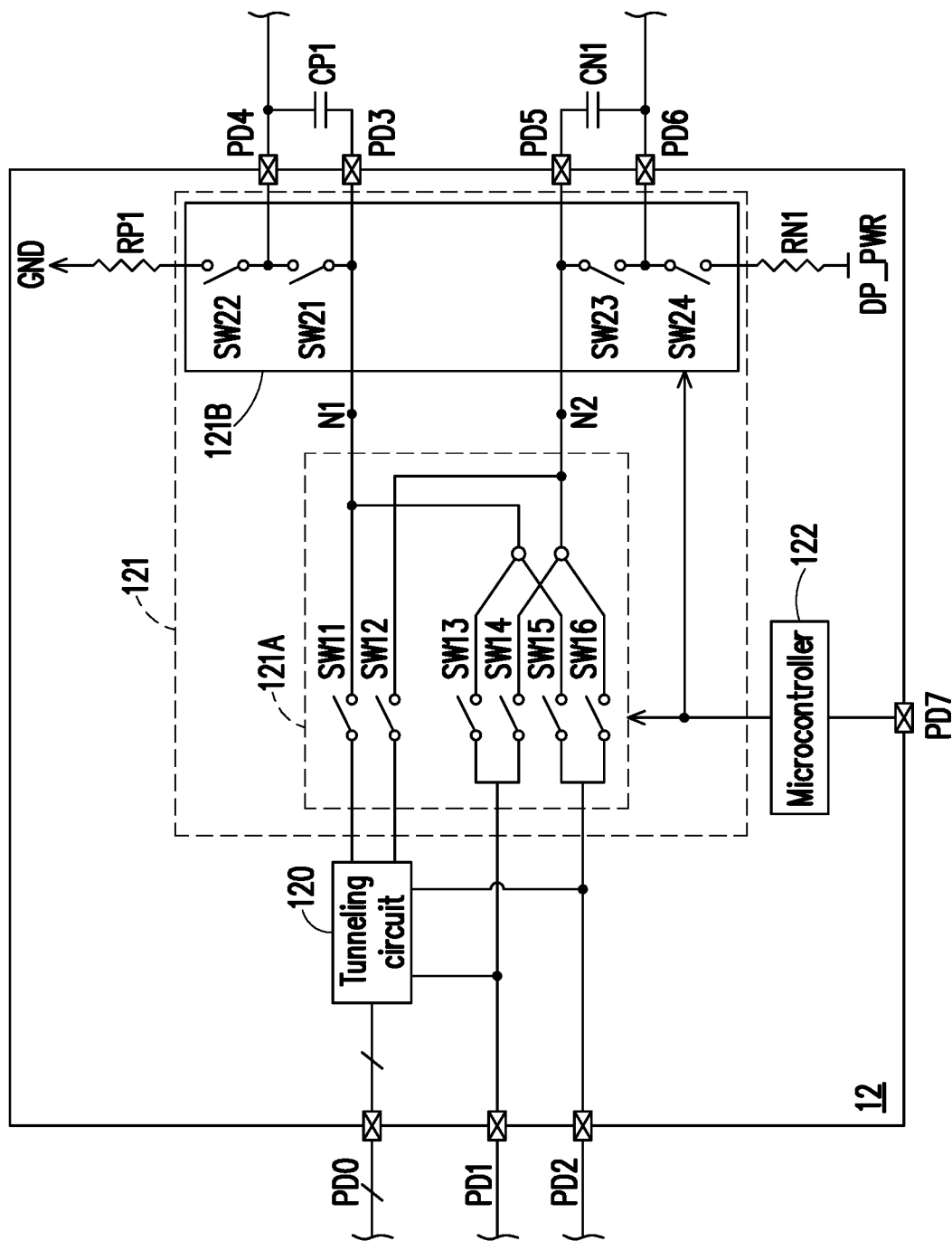
FIG. 2 is a circuit block diagram illustrating the chip shown in FIG. 1A and FIG. 1B according to an embodiment of the invention.

FIG. 2 is a circuit block diagram illustrating the chip 12 shown in FIG. 1A and FIG. 1B according to an embodiment of the invention. The chip 12 can be connected to the first capacitor CP1 and the second capacitor CN1. The chip 12, the first capacitor CP1 and the second capacitor CN1 shown in FIG. 2 can refer to the related descriptions of the chip 12, the first capacitor CP1 and the second capacitor CN1 shown in FIG. 1A and (or) FIG. 1B, which are not repeated hereinafter. In the embodiment shown in FIG. 2, the chip 12 further includes a tunneling circuit 120, a connecting circuit 121, a microcontroller 122, a pull-down resistor RP1 and a pull-up resistor RN1.

Referring to FIG. 1A, FIG. 1B and FIG. 2, the pad PD0, the pad PD1 and the pad PD2 are connected to the tunneling circuit 120. In the first mode (USB 4.0 mode), the tunneling circuit 120 can output the first AUX channel signal and the second AUX channel signal to the connecting circuit 121 in the first mode. The connecting circuit 121 is coupled to the tunneling circuit 120 to receive the first AUX channel signal and the second AUX channel signal. The connecting circuit 121 is also coupled to the pull-down resistor RP1, the pull-up resistor RN1, the pad PD1, the pad PD2, the pad PD3, the pad PD4, the pad PD5 and the pad PD6.

The microcontroller 122 is connected to the pad PD7 to receive the connection configuration signal from the PD controller 13. The microcontroller 122 is also coupled to the connecting circuit 121. The microcontroller generates at least one switch signal to the connecting circuit 121 according to the connection configuration signal to indicate that the chip 12 operates in the first mode (USB 4.0 mode) or the second mode (ALT mode).

When the USB connector 20 of an external device (e.g., the host 2 shown in FIG. 1A) transmits the signals compliant with the USB 4.0 specification to the USB connector 10 of the interface conversion device 1 (e.g., when the chip 12 operates in the first mode), the pad PD1 and the pad PD2 can receive (transmit) the side band signals compliant with the USB 4.0 specification from/to the host 2. When the chip 12 operates in the first mode (USB 4.0 mode), the tunneling circuit 120 can unpack and (or) decode the differential signals received by the pad PD0 to generate data and the AUX channel signals (the first AUX channel signal and the second AUX channel signal) compliant with the DP specification. The tunneling circuit 120 can output the first AUX channel signal and the second AUX channel signal to the connecting circuit 121 in the first mode. When the chip 12 operates in the first mode (USB 4.0 mode), the connecting circuit 121 is configured to selectively transmit the first AUX channel signal and the second AUX channel signal generated by the tunneling circuit 120 to the pad PD3 and the pad PD5 respectively, selectively connect the pad PD4 to a first terminal of the pull-down resistor RP1, and selectively connect the pad PD6 to a first terminal of the pull-up resistor RN1. A second terminal of the pull-up resistor RN1 receives a reference voltage (e.g., the system voltage DP_PWR). A second terminal of the pull-down resistor RP1 receives a reference voltage (e.g., the ground voltage GND lower than the system voltage DP_PWR).

When the USB connector 20 of an external device (e.g., the host 2' shown in FIG. 1A) transmits the ALT mode signals compliant with the USB specification to the USB connector 10 of the interface conversion device 1 (i.e., when the chip 12 operates in the second mode), the pad PD1 and the pad PD2 can receive (transmit) the AUX channel signals compliant with the DP specification (the third AUX channel signal and the fourth AUX channel signal) from/to the host 2'. In the second mode (ALT mode), the tunneling circuit 120 may not output (not generate) the AUX channel signals (the first AUX channel signal and the second AUX channel signal) to the connecting circuit 121. When the chip 12 operates in the second mode (ALT mode), the connecting circuit 121 is configured to selectively connect one of the pad PD1 and the pad PD2 to the pad PD4, and selectively connect the other one of the pads PD1 and the pad PD2 to the pad PD6.

The invention does not limit the implementation details of the connecting circuit 121. For instance, in the embodiment shown in FIG. 2, the connecting circuit 121 includes a switch circuit 121A and a switch circuit 121B. The switch circuit 121A is coupled to the tunneling circuit 120, the pad PD1, the pad PD2, the microcontroller 122, a node N1 and a node N2. The second switch circuit 121B is connected to the node N1, the node N2, the pull-down resistor RP1, the pull-up resistor RN1, the pad PD3, the pad PD4, the pad PD5, the pad PD6 and the microcontroller 122.

When the chip 12 operates in the first mode (USB 4.0 mode), the switch circuit 121A can selectively transmit the first AUX channel signal and the second AUX channel signal generated by the tunneling circuit 120 to the node N1 and the node N2 respectively. When the chip 12 operates in the first mode (USB 4.0 mode), the switch circuit 121B is configured to connect the node N1 to the pad PD3 and connect the node N2 to the pad PD5.

When the chip 12 operate in the second mode (ALT mode), the switch circuit 121A is configured to selectively connect one of the pad PD1 and the pad PD2 to the node N1, and selectively connect the other one of the pad PD1 and the pad PD2 to the node N2. For instance, when the signal received by the SBU pin 101 of the USB connector 10 is the positive AUX channel signal and the signal received by the SBU pin 102 of the USB connector 10 is the negative AUX channel signal, the switch circuit 121A can connect the pad PD1 to the node N1 and connect the pad PD2 to the node N2. Conversely, when the signal of SBU pin 101 is the negative AUX channel signal and the signal of SBU pin 102 is the positive AUX channel signal, the switch circuit 121A can connect the pad PD2 to the node N1 and connect the pad PD1 to the node N2. When the chip 12 operates in the second mode (ALT mode), the switch circuit 121B can connect the node N1 to the pad PD4 and connect the node N2 to the pad PD6.

The invention does not limit the implementation details of the switch circuit 121A. For instance, in the embodiment shown in FIG. 2, the switch circuit 121A includes a switch SW11, a switch SW12, a switch SW13, a switch SW14, a switch SW15 and a switch SW16. A first terminal of the switch SW11 is coupled to the tunneling circuit 120 to receive the first AUX channel signal. A second terminal of the switch SW11 is coupled to the node N1. The switch SW12 is coupled to the tunneling circuit 120 to receive the second AUX channel signal. A second terminal of the switch SW12 is coupled to the node N2. A first terminal of the switch SW13 is coupled to the pad PD1. A second terminal of the switch SW13 is coupled to the node N1. A first terminal of the switch SW14 is coupled to the pad PD1. A second terminal of the switch SW14 is coupled to the node N2. A first terminal of the switch SW15 is coupled to the pad PD2. A second terminal of the switch SW15 is coupled to the node N1. A first terminal of the switch SW16 is coupled to the pad PD2. A second terminal of the switch SW16 is coupled to the node N2.

The invention does not limit the implementation details of the switch circuit 121B. For instance, in the embodiment shown in FIG. 2, the switch circuit 121B includes a switch SW21, a switch SW22, a switch SW23 and a switch SW24. A first terminal of the switch SW21 is coupled to the node N1 and the pad PD3. A second terminal of the switch SW21 is coupled to the pad PD4. A first terminal of the switch SW22 is coupled to the pad PD4. A second terminal of the switch SW22 is coupled to the pull-down resistor RP1. A first terminal of the switch SW23 is coupled to the node N2 and the pad PD5. A second terminal of the switch SW23 is coupled to the pad PD6. A first terminal of the switch SW24 is coupled to the pad PD6. A second terminal of the switch SW24 is coupled to the pull-up resistor RN1.

Figure 3A:
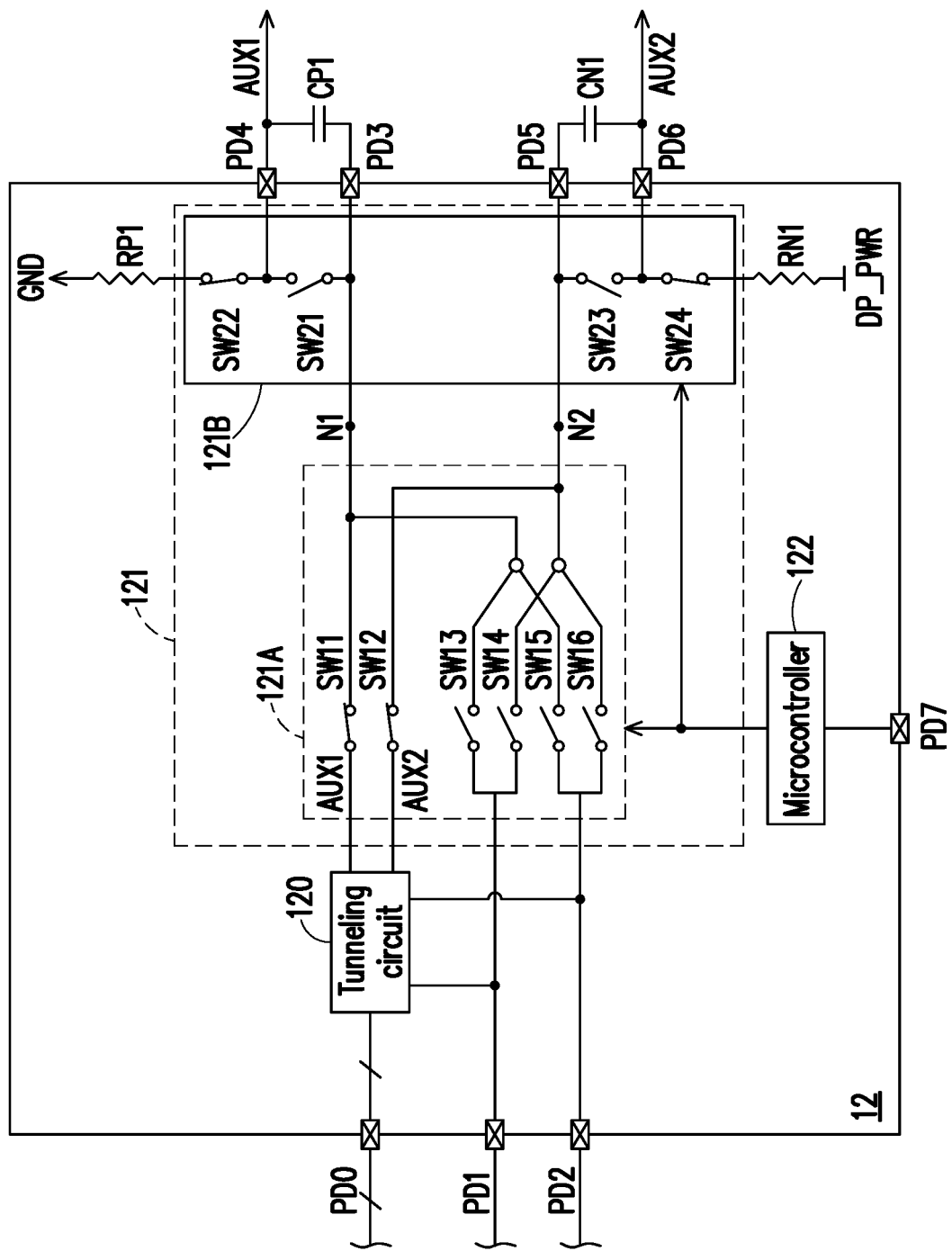
FIG. 3A is a schematic diagram illustrating a scenario when the chip shown in FIG. 2 operates in a first mode according to an embodiment of the invention.
Figure 3B:
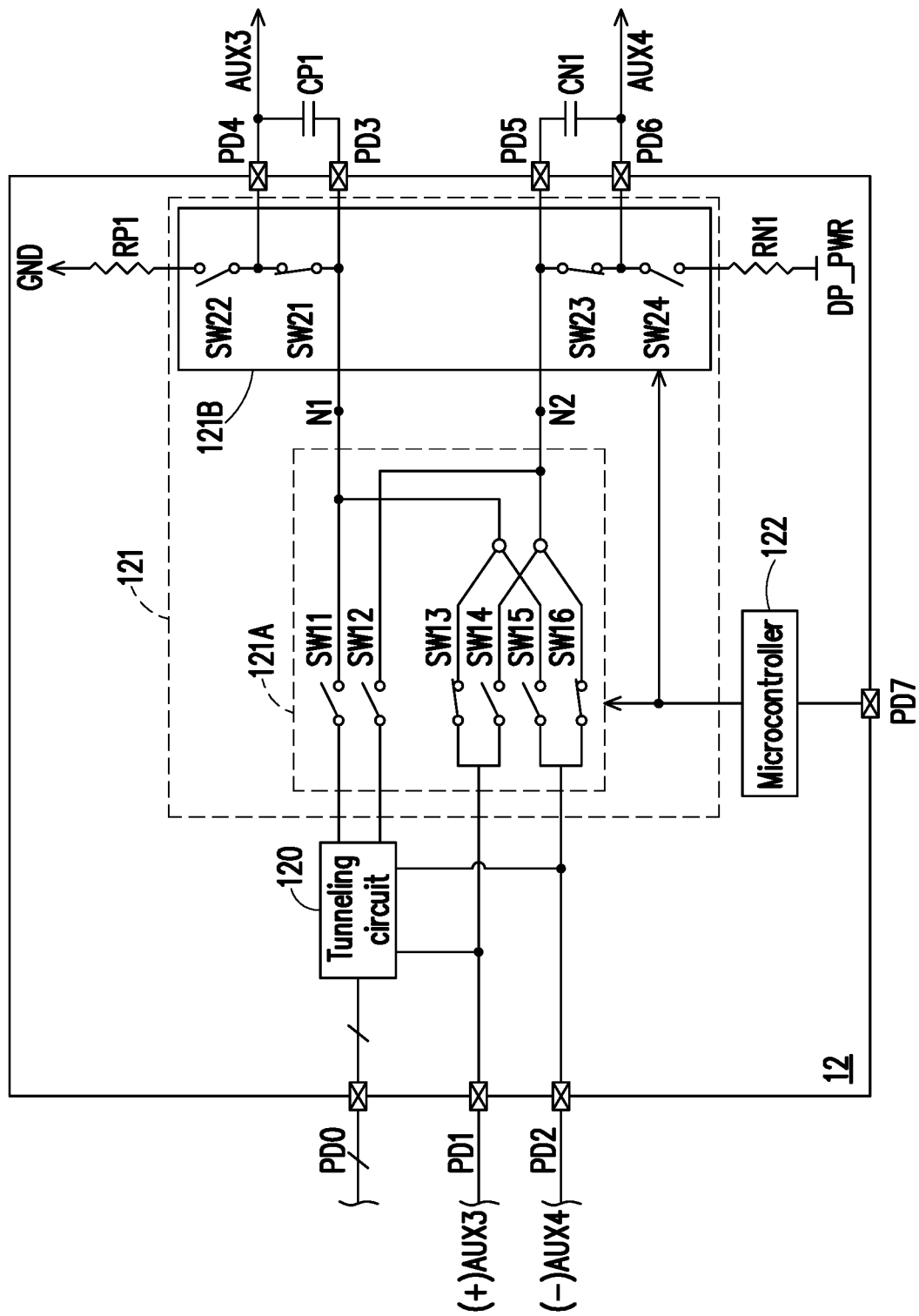
FIG. 3B is a schematic diagram illustrating a scenario when the chip shown in FIG. 2 operates in a second mode according to an embodiment of the invention.
Figure 3C:
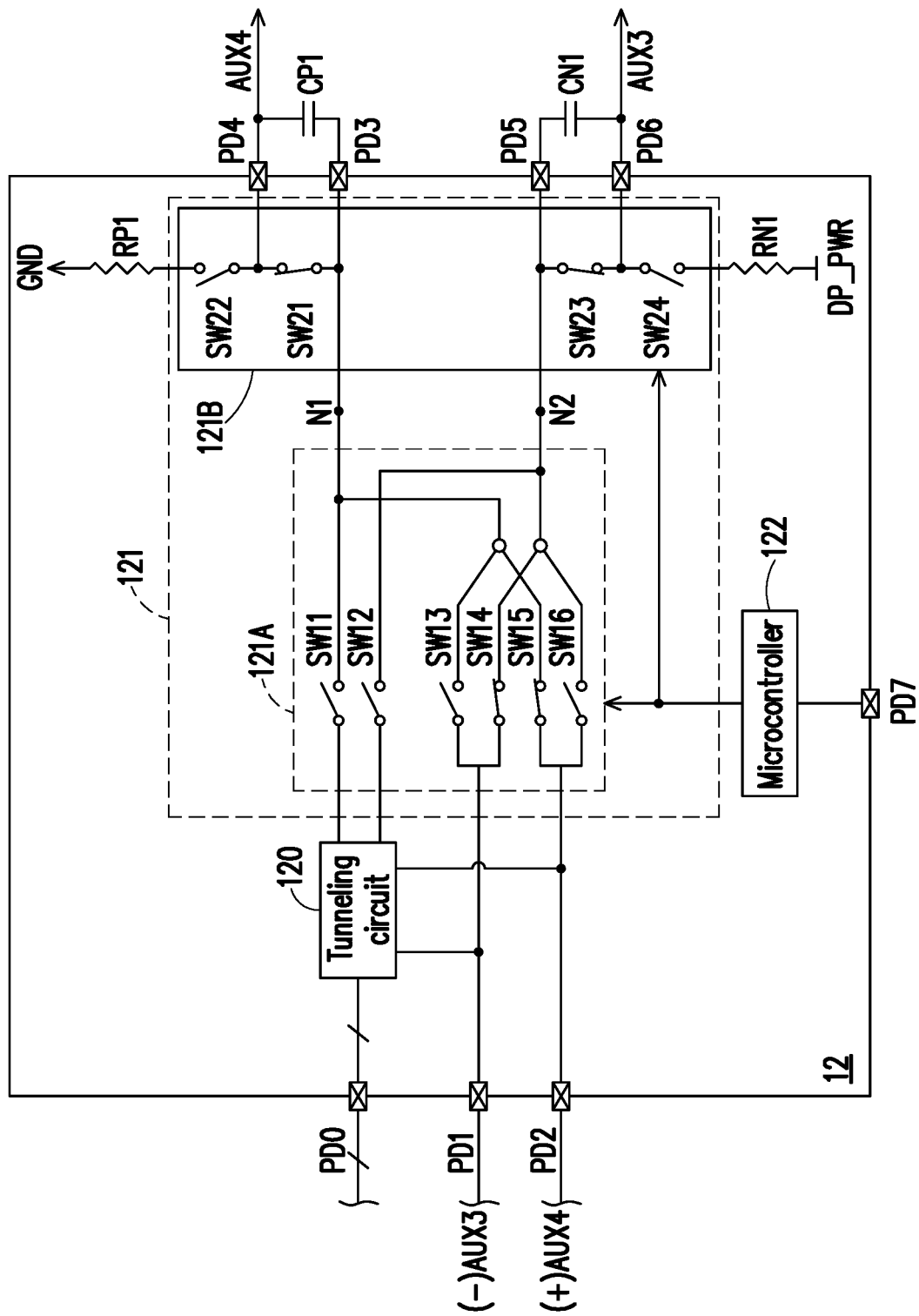
FIG. 3C is a schematic diagram illustrating another scenario when the chip shown in FIG. 2 operates in a second mode according to an embodiment of the invention.

FIG. 3A to FIG. 3C will illustrate the detailed operations of the first switch circuit 121A and the second switch circuit 121B in different modes and states. FIG. 3A is a schematic diagram illustrating a scenario when the chip 12 shown in FIG. 2 operates in the first mode (USB 4.0 mode) according to an embodiment of the invention. As shown in FIG. 3A, when the chip 12 operates in the first mode (USB 4.0 mode), the tunneling circuit 120 of the chip 12 can unpack and (or) decode the differential signals received by the pad PD0 to generate data and the AUX channel signals (a first AUX channel signal AUX1 and a second AUX channel signal AUX2) compliant with the DP specification. Based on the control of the microcontroller 122, the switch SW11 and the second switch SW12 are turned on to transmit the first AUX channel signal AUX1 and the second AUX channel signal AUX2 generated by the tunneling circuit 120 to the pad PD3 and the pad PD5. Based on the control of the microcontroller 122, in the first mode (USB 4.0 mode), the switch SW13, the switch SW14, the switch SW15, the switch SW16, the switch SW21 and the switch SW23 are turned off, and the switch SW22 and the switch SW24 are turned on. In this way, the first AUX channel signal AUX1 generated by the tunneling circuit 120 is transmitted to the first pin 110 of the AUX channel of the DP connector 11 through the pad PD3 and the capacitor CP1, and the pull-down resistor RP1 weakly pulls down a DC level of the first pin 110 to the first reference voltage (e.g., the ground voltage GND) through the pad PD4. In addition, the second AUX channel signal AUX2 generated by the tunneling circuit 120 is transmitted to the second pin 111 of the AUX channel of the DP connector 11 through the pad PD5 and the capacitor CN1, and the pull-up resistor RN1 weakly pulls up a DC level of the second pin 111 to the second reference voltage (e.g., the system voltage DP_PWR higher than the ground voltage GND) through the pad PD6.

When the switch SW13 and the switch SW16 are turned on in the second mode (ALT mode), the switch SW14 and the switch SW15 are turned off. When the switch SW13 and the switch SW16 are turned off in the second mode (ALT mode), the switch SW14 and the switch SW15 are turned on. For instance, when the signal received by the SBU pin 101 of the USB connector 10 is the positive AUX channel signal and the signal received by the SBU pin 102 of the USB connector 10 is the negative AUX channel signal, Based on the control of the microcontroller 122, the switch SW13 and the switch SW16 are turned on in the second mode, and the switch SW14 and the switch SW15 are turned off in the second mode. Conversely, when the signal of SBU pin 101 is the negative AUX channel signal and the signal of SBU pin 102 is the positive AUX channel signal, Based on the control of the microcontroller 122, the switch SW13 and the switch SW16 are turned off in the second mode, and the switch SW14 and the switch SW15 are turned on in the second mode.

FIG. 3B is a schematic diagram illustrating a scenario when the chip 12 shown in FIG. 2 operates in the second mode (ALT mode) according to an embodiment of the invention. When the chip 12 operates in the second mode (ALT mode), the pad PD1 and the pad PD2 of the chip 12 receive a third AUX channel signals AUX3 and a fourth AUX channel signal AUX4 from the SBU pin 101 and the SBU pin 102 of the USB connector 10. In the scenario shown in FIG. 3B, it is assumed that the third AUX channel signal AUX3 received by the SBU pin 101 of the USB connector 10 is positive, and the fourth AUX channel signal AUX4 received by the SBU pin 102 of the USB connector 10 is negative. Based on the control of the microcontroller 122, in the second mode (ALT mode), the switch SW13, the second switch SW16, the switch SW21 and the second switch SW23 are turned on to transmit the third AUX channel signal AUX3 and the fourth AUX channel signal AUX4 of the pad PD1 and the pad PD2 to the pad PD4 and the pad PD6.

In the scenario shown in FIG. 3B, based on the control of the microcontroller 122, the switch SW11, the switch SW12, the switch SW14, the switch SW15, the switch SW22 and the switch SW24 are turned off, and the switch SW13, the switch SW16, the switch SW21 and the switch SW23 are turned on. Therefore, the capacitor CP1, the capacitor CN1, the pull-down resistor RP1 and the pull-up resistor RN1 are disabled. The pull-down resistor RP1, the pull-up resistor RN1, the capacitor CP1 and the capacitor CN1 will not become the impedance of the pad PD4 and the pad PD6.

FIG. 3C is a schematic diagram illustrating another scenario when the chip 12 shown in FIG. 2 operates in the second mode (ALT mode) according to an embodiment of the invention. When the chip 12 operates in the second mode (ALT mode), the pad PD1 and the pad PD2 of the chip 12 receive a third AUX channel signals AUX3 and a fourth AUX channel signal AUX4 from the SBU pin 101 and the SBU pin 102 of the USB connector 10. In the scenario shown in FIG. 3C, it is assumed that the third AUX channel signal AUX3 received by the SBU pin 101 of the USB connector 10 is negative, and the fourth AUX channel signal AUX4 received by the SBU pin 102 of the USB connector 10 is positive. Based on the control of the microcontroller 122, in the second mode (ALT mode), the switch SW14, the second switch SW15, the switch SW21 and the second switch SW23 are turned on to transmit the third AUX channel signal AUX3 and the fourth AUX channel signal AUX4 of the pad PD1 and the pad PD2 to the pad PD6 and the pad PD4.

In the scenario shown in FIG. 3C, based on the control of the microcontroller 122, the switch SW11, the switch SW12, the switch SW13, the switch SW16, the switch SW22 and the switch SW24 are turned off, and the switch SW14, the switch SW15, the switch SW21 and the switch SW23 are turned on. Therefore, the capacitor CP1, the capacitor CN1, the pull-down resistor RP1 and the pull-up resistor RN1 are disabled. The pull-down resistor RP1, the pull-up resistor RN1, the capacitor CP1 and the capacitor CN1 will not become the impedance of the pad PD4 and the pad PD6.

In summary, the interface conversion device 1 and the chip 12 can provide the interface conversion function of different specifications in different operation modes. The interface conversion device 1 can process the signals of the USB connector 10, regardless of whether the signals transmitted by an external device (e.g., the host 2 or the host 2') to the USB connector 10 is the signals in the first mode (USB 4.0 mode) or the signals in the second mode (ALT mode). The chip 12 can allow the AUX channel pins of the DP connector 11 to be compliant with the DP specification in different modes. As a result, the interface conversion device 1 and the chip 12 can effectively improve the compatibility when devices of different specifications are connected.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A chip, comprising:
a first pad, configured to be coupled to a first side band use pin of a universal serial bus connector;
a second pad, configured to be coupled to a second side band use pin of the universal serial bus connector;
a third pad, configured to be coupled to a first terminal of a first capacitor;
a fourth pad, configured to be coupled to a second terminal of the first capacitor, and configured to be coupled to a first pin of an auxiliary channel of a display port connector;
a fifth pad, configured to be coupled to a first terminal of a second capacitor; and
a sixth pad, configured to be coupled to a second terminal of the second capacitor, and configured to be coupled to a second pin of the auxiliary channel of the display port connector, wherein
when the chip operates in a first mode, a first auxiliary channel signal and a second auxiliary channel signal compliant with a display port specification are selectively transmitted to the third pad and the fifth pad respectively, a voltage of the fourth pad is selectively weakly pulled down, and a voltage of the sixth pad is selectively weakly pulled up, and
when the chip operates in a second mode, the first and second terminals of the first capacitor are coupled together, and the first capacitor is disabled, the first and second terminals of the second capacitor are coupled together, and the second capacitor is disabled, one of the first pad and the second pad is selectively connected to the fourth pad, and the other one of the first pad and the second pad is selectively connected to the sixth pad.

2. The chip of claim 1, further comprising:
a pull-down resistor;
a pull-tip resistor;
a tunneling circuit, configured to provide the first auxiliary channel signal and the second auxiliary channel signal in the first mode; and
a connecting circuit, coupled to the tunneling circuit to receive the first auxiliary channel signal and the second auxiliary channel signal, and coupled to the pull-down resistor, the pull-up resistor, the first pad, the second pad, the third pad, the fourth pad, the fifth pad and the sixth pad;
wherein when the chip operates in the first mode, the connecting circuit is configured to selectively transmit the first auxiliary channel signal and the second auxiliary channel signal to the third pad and the fifth pad respectively, selectively connect the fourth pad to the pull-down resistor, and selectively connect the sixth pad to the pull-up resistor; and
wherein when the chip operates in the second mode, the connecting circuit is configured to selectively connect one of the first pad and the second pad to the fourth pad, and selectively connect the other one of the first pad and the second pad to the sixth pad.

3. The chip of claim 2, further comprising:
a microcontroller, coupled to the connecting circuit, wherein the microcontroller generates at least one switch signal to the connecting circuit according to a connection configuration signal to indicate that the chip operates in the first mode or the second mode.

4. The chip of claim 2, wherein
when the chip operates in the first mode, signals transmitted by the first pad and the second pad are a side band signal compliant with a universal serial bus 4.0 specification; and
when the chip operates in the second mode, the signals transmitted by the first pad and the second pad are a third auxiliary channel signal and a fourth auxiliary channel signal compliant with the display port specification.

5. The chip of claim 2, wherein the connecting circuit comprises:
a first node;
a second node;
a first switch circuit, coupled to the first pad, the second pad, the tunneling circuit, the first node and the second node; and
a second switch circuit, coupled to the first node, the second node, the pull-down resistor, the pull-up resistor, the third pad, the fourth pad, the fifth pad and the sixth pad.

6. The chip of claim 5, wherein
when the chip operates in the first mode, the first switch circuit is configured to selectively transmit the first auxiliary channel signal and the second auxiliary channel signal to the first node and the second node respectively; and
when the chip operates in the second mode, the first switch circuit is configured to selectively connect one of the first pad and the second pad to the first node, and selectively connect the other one of the first pad and the second pad to the second node.

7. The chip of claim 5, wherein the first switch circuit comprises:
a first switch, having a first terminal coupled to the tunneling circuit to receive the first auxiliary channel signal, wherein a second terminal of the first switch is coupled to the first node;
a second switch, having a first terminal coupled to the tunneling circuit to receive the second auxiliary channel signal, wherein a second terminal of the second switch is coupled to the second node;

a third switch, having a first terminal coupled to the first pad and a second terminal coupled to the first node;
a fourth switch, having a first terminal coupled to the first pad and a second terminalcoupled to the second node;
a fifth switch, having a first terminal coupled to the second pad and a second terminal coupled to the first node; and
a sixth switch, having a first terminal coupled to the second pad and a second terminal coupled to the second node;
wherein in the first mode, the first switch and the second switch are turned on, and the third switch, the fourth switch, the fifth switch and the sixth switch are turned off;
wherein in the second mode, the first switch and the second switch are turned off;
wherein in the second mode, when the third switch and the sixth switch are turned on, the fourth switch and the fifth switch are turned off; and
wherein in the second mode, when the third switch and the sixth switch are turned off, the fourth switch and the fifth switch are turned on.

8. The chip of claim 5, wherein
when the chip operates in the first mode, the second switch circuit is configured to connect the first node to the third pad, and connect the second node to the fifth pad; and
when the chip operates in the second mode, the second switch circuit is configured to connect the first node to the fourth pad, and connect the second node to the sixth pad.

9. The chip of claim 5, wherein the second switch circuit comprises:
a first switch, having a first terminal coupled to the first node and the third pad and a second terminal coupled to the fourth pad, wherein the first switch is turned off in the first mode, and the first switch is turned on in the second mode;
a second switch, having a first terminal coupled to the fourth pad and a second terminal coupled to the pull-down resistor, wherein the second switch is turned on in the first mode, and the second switch is turned off in the second mode;
a third switch, having a first terminal coupled to the second node and the fifth pad and a second terminal coupled to the sixth pad, wherein the third switch is turned off in the first mode, and the third switch is turned on in the second mode; and
a fourth switch, having a first terminal coupled to the sixth pad and a second terminal coupled to the pull-up resistor, wherein the fourth switch is turned on in the first mode, and the fourth switch is turned off in the second mode.

10. An interface conversion device, comprising:
a universal serial bus connector;
a display port connector;
a first capacitor and a second capacitor; and
a chip, having a first pad, a second pad, a third pad, a fourth pad, a fifth pad and a sixth pad, wherein the first pad is coupled to a first side band use pin of the universal serial bus connector, the second pad is coupled to a second side band use pin of the universal serial bus connector, the third pad is coupled to a first terminal of the first capacitor, the fourth pad is coupled to a second terminal of the first capacitor and a first pin of an auxiliary channel of the display port connector, the fifth pad is coupled to a first terminal of the second capacitor, and the sixth pad is coupled to a second terminal of the second capacitor and a second pin of the auxiliary channel of the display port connector;
wherein when the chip operates in a first mode, the chip selectively transmits a first auxiliary channel signal and a second auxiliary channel signal compliant with a display port specification to the third pad and the fifth pad respectively, the chip selectively weakly pulls down a voltage of the fourth pad, and the chip selectively weakly pulls up a voltage of the sixth pad;
wherein when the chip operates in a second mode, the first and second tenninals of the first capacitor are coupled together, and the first capacitor is disabled, the first and second terminals of the second capacitor are coupled together, and the second capacitor is disabled, the chip selectively connects one of the first pad and the second pad to the fourth pad, and the chip selectively connects the other one of the first pad and the second pad to the sixth pad.

11. The interface conversion device of claim 10, wherein the chip further comprises:
a pull-down resistor;
a pull-up resistor;
a tunneling circuit, configured to provide the first auxiliary channel signal and the second auxiliary channel signal in the first mode; and
a connecting circuit, coupled to the tunneling circuit to receive the first auxiliary channel signal and the second auxiliary channel signal, and coupled to the pull-down resistor, the pull-up resistor, the first pad, the second pad, the third pad, the fourth pad, the fifth pad and the sixth pad;
wherein when the chip operates in the first mode, the connecting circuit is configured to selectively transmit the first auxiliary channel signal and the second auxiliary channel signal to the third pad and the fifth pad respectively, selectively connect the fourth pad to the pull-down resistor, and selectively connect the sixth pad to the pull-up resistor; and
wherein when the chip operates in the second mode, the connecting circuit is configured to selectively connect one of the first pad and the second pad to the fourth pad, and selectively connect the other one of the first pad and the second pad to the sixth pad.

12. The interface conversion device of claim 11, wherein the chip further comprises:
a microcontroller, coupled to the connecting circuit, wherein the microcontroller generates at least one switch signal to the connecting circuit according to a connection configuration signal to indicate that the chip operates in the first mode or the second mode.

13. The interface conversion device of claim 11, wherein
when the chip operates in the first mode, signals transmitted by the first pad and the second pad are a side band signal compliant with a universal serial bus 4.0 specification; and
when the chip operates in the second mode, the signals transmitted by the first pad and the second pad are a third auxiliary channel signal and a fourth auxiliary channel signal compliant with the display port specification.

14. The interface conversion device of claim 11, wherein the connecting circuit comprises:
a first node;
a second node;
a first switch circuit, coupled to the first pad, the second pad, the tunneling circuit, the first node and the second node; and a second switch circuit, coupled to the first node, the second node, the pull-down resistor, the pull-up resistor, the third pad, the fourth pad, the fifth pad and the sixth pad.

15. The interface conversion device of claim 14, wherein when the chip operates in the first mode, the first switch circuit is configured to selectively transmit the first auxiliary channel signal and the second auxiliary channel signal to the first node and the second node respectively; and when the chip operates in the second mode, the first switch circuit is configured to selectively connect one of the first pad and the second pad to the first node, and selectively connect the other one of the first pad and the second pad to the second node.

16. The interface conversion device of claim 14, wherein the first switch circuit comprises:
   a first switch, having a first terminal coupled to the tunneling circuit to receive the first auxiliary channel signal, wherein a second terminal of the first switch is coupled to the first node;
   a second switch, having a first terminal coupled to the tunneling circuit to receive the second auxiliary channel signal, wherein a second terminal of the second switch is coupled to the second node;
   a third switch, having a first terminal coupled to the first pad and a second terminal coupled to the first node;
   a fourth switch, having a first terminal coupled to the first pad and a second terminal coupled to the second node;
   a fifth switch, having a first terminal coupled to the second pad and a second terminal coupled to the first node; and
   a sixth switch, having a first terminal coupled to the second pad and a second terminal coupled to the second node;
   wherein in the first mode, the first switch and the second switch are turned on, and the third switch, the fourth switch, the fifth switch and the sixth switch are turned off;
   wherein in the second mode, the first switch and the second switch are turned off;
   wherein in the second mode, when the third switch and the sixth switch are turned on, the fourth switch and the fifth switch are turned off; and wherein n the second mode, when the third switch and the sixth switch are turned off, the fourth switch and the fifth switch are turned on.

17. The interface conversion device of claim 14, wherein when the chip operates in the first mode, the second switch circuit is configured to connect the first node to the third pad, and connect the second node to the fifth pad; and when the chip operates in the second mode, the second switch circuit is configured to connect the first node to the fourth pad, and connect the second node to the sixth pad.

18. The interface conversion device of claim 14, wherein the second switch circuit comprises:
   a first switch, having a first terminal coupled to the first node and the third pad and a second terminal coupled to the fourth pad, wherein the first switch is turned off in the first mode, and the first switch is turned on in the second mode;
   a second switch, having a first terminal coupled to the fourth pad and a second terminal coupled to the pull-down resistor, wherein the second switch is turned on in the first mode, and the second switch is turned off in the second mode;
   a third switch, having a first terminal coupled to the second node and the fifth pad and a second terminal coupled to the sixth pad, wherein the third switch is turned off in the first mode, and the third switch is turned on in the second mode; and
   a fourth switch, having a first terminal coupled to the sixth pad and a second terminal coupled to the pull-up resistor, wherein the fourth switch is turned on in the first mode, and the fourth switch is turned off in the second mode.

19. The interface conversion device of claim 10, further comprising:
   a power delivery controller, configured to provide a connection configuration signal to the chip according to a connection configuration of the universal serial bus connector, so as to indicate that the chip operates in the first mode or the second mode.

* * * * *